United States Patent
Wieczorek et al.

(10) Patent No.: US 10,438,002 B2
(45) Date of Patent: Oct. 8, 2019

(54) FIELD-BUS DATA TRANSMISSION

(71) Applicant: Beckhoff Automation GmbH, Verl (DE)

(72) Inventors: Felix Wieczorek, München (DE); Frank Schiller, Nürnberg (DE)

(73) Assignee: Beckhoff Automation GmbH, Verl (DE)

(*) Notice: Subject to any disclaimer, the term of this patent is extended or adjusted under 35 U.S.C. 154(b) by 65 days.

(21) Appl. No.: 14/513,282

(22) Filed: Oct. 14, 2014

(65) Prior Publication Data

US 2015/0067350 A1 Mar. 5, 2015

Related U.S. Application Data

(63) Continuation of application No. PCT/EP2013/057077, filed on Apr. 4, 2013.

(30) Foreign Application Priority Data

Apr. 17, 2012 (DE) .................. 10 2012 206 272

(51) Int. Cl.
*G06F 21/60* (2013.01)
*H04L 9/06* (2006.01)
(Continued)

(52) U.S. Cl.
CPC ........ *G06F 21/602* (2013.01); *G06F 11/1004* (2013.01); *H03M 13/09* (2013.01);
(Continued)

(58) Field of Classification Search
CPC ..... H04L 9/065; H04L 9/3242; H04L 9/3247; H04L 63/123; H04L 12/40006;
(Continued)

(56) References Cited

U.S. PATENT DOCUMENTS 4,387,441 A * 6/1983 Kocol ............... G06F 15/17337
370/412
4,417,334 A * 11/1983 Gunderson ........ H04B 10/2725
340/2.9
(Continued)

FOREIGN PATENT DOCUMENTS

CN 1290468 C 12/2006
CN 101047715 A 10/2007
(Continued)

OTHER PUBLICATIONS

Wikipedia, "Checksum" last edited Feb. 7, 2019, retrieved on Mar. 21, 2019, 4 pages.
(Continued)

*Primary Examiner* — Kambiz Zand
*Assistant Examiner* — Shu Chun Gao
(74) *Attorney, Agent, or Firm* — Dorsey & Whitney LLP

(57) ABSTRACT

A communication subscriber for a field-bus system for transmitting data, comprises a safety layer with an error-safety layer protecting the data against random data transmission errors and an information-security layer protecting against manipulation of data and/or against unauthorized reading of data. The communication subscriber is configured during transmission mode to process the data to be transmitted first by means of the error-safety layer and then by means of the information-security layer, and during receipt mode to process the data first by means of the information-security layer and then by means of the error-safety layer.

19 Claims, 2 Drawing Sheets

(51) Int. Cl.
*H04L 9/32* (2006.01)
*H04L 29/06* (2006.01)
*H04L 12/40* (2006.01)
*G06F 11/10* (2006.01)
*H03M 13/09* (2006.01)
*G05B 19/418* (2006.01)

(52) U.S. Cl.
CPC ............ *H04L 9/065* (2013.01); *H04L 9/3242* (2013.01); *H04L 9/3247* (2013.01); *H04L 12/40006* (2013.01); *H04L 63/123* (2013.01); *G05B 19/4185* (2013.01); *H04L 2012/4026* (2013.01); *Y02P 90/18* (2015.11)

(58) Field of Classification Search
CPC ............ H04L 2012/4026; H04L 12/24; H04L 12/4625; H04L 41/00; H04L 2012/40221; H04L 12/407; H04L 12/4135; H04L 12/40013; H04L 9/3271; H04L 9/0637; H04L 9/0662; H04L 9/0631; H04L 63/0435; H04L 63/062; H04L 63/08; H04L 2209/84; G06F 11/1004; G06F 21/602; H03M 13/09; G05B 19/4185; G05B 19/042; G05B 2219/25012; G05B 2219/25174; H04W 12/06
See application file for complete search history.

(56) References Cited

U.S. PATENT DOCUMENTS

| | | | | |
|---|---|---|---|---|
| 5,307,371 A * | 4/1994 | Juola | ................ | H04B 7/2643 375/133 |
| 5,524,052 A * | 6/1996 | Augustine | ............ | H04L 41/046 370/401 |
| 5,936,949 A * | 8/1999 | Pasternak | ............ | H04L 1/0057 370/310.1 |
| 6,600,723 B1 * | 7/2003 | Reeb | ................... | B60R 16/0315 361/90 |
| 6,754,824 B1 * | 6/2004 | Persson | ................ | H04L 9/3242 348/466 |
| 6,980,658 B1 * | 12/2005 | Rezaiifar | ................ | H04L 9/12 380/264 |
| 6,999,443 B1 * | 2/2006 | Kuskin | ................ | H04L 63/162 370/338 |
| 7,080,046 B1 * | 7/2006 | Rezvani | ................. | G06F 21/31 705/26.1 |
| 7,084,951 B2 * | 8/2006 | Silverbrook | ............... | B41J 2/14 347/86 |
| 7,085,937 B1 * | 8/2006 | Rezvani | .................. | G06F 21/31 709/229 |
| 7,234,645 B2 * | 6/2007 | Silverbrook | ............... | B41J 2/14 235/494 |
| 8,922,791 B2 * | 12/2014 | Silverbrook | ............... | B41J 2/14 358/1.1 |
| 9,219,708 B2 * | 12/2015 | Anati | ..................... | G06F 21/445 |
| 9,231,926 B2 * | 1/2016 | Adkins | .................. | H04L 9/0866 |
| 9,647,834 B2 * | 5/2017 | Thanos | .................. | G01D 4/002 |
| 2002/0010874 A1 | 1/2002 | Barthel | | |
| 2003/0223585 A1 | 12/2003 | Tardo et al. | | |
| 2004/0059917 A1 * | 3/2004 | Powers | ................. | G06F 21/606 713/176 |
| 2004/0083362 A1 * | 4/2004 | Park | ................... | H04L 63/0457 713/162 |
| 2006/0120521 A1 * | 6/2006 | Whitehead | ........... | H04L 1/0041 380/46 |
| 2007/0061674 A1 * | 3/2007 | Hansen | ................ | H04L 63/123 714/758 |
| 2007/0174916 A1 * | 7/2007 | Ching | ................... | G06F 21/606 726/24 |
| 2008/0270793 A1 * | 10/2008 | Nowottnick | .......... | H04L 9/3271 713/168 |
| 2009/0119437 A1 * | 5/2009 | Hilscher | ............... | H04L 12/407 710/305 |
| 2009/0132802 A1 * | 5/2009 | Amann | .................... | H04L 9/004 713/150 |
| 2009/0193319 A1 * | 7/2009 | Shen | ....................... | G06F 11/10 714/777 |
| 2010/0322398 A1 * | 12/2010 | Chen | ..................... | H04M 11/064 379/93.02 |
| 2011/0060855 A1 * | 3/2011 | Kuschke | .............. | G05B 19/042 710/106 |
| 2011/0138192 A1 * | 6/2011 | Kocher | .................. | G06F 21/602 713/189 |
| 2015/0121084 A1 * | 4/2015 | Kirrmann | ............. | H04L 9/0618 713/176 |
| 2017/0026349 A1 * | 1/2017 | Smith | ................. | H04L 63/0471 |
| 2017/0308709 A1 * | 10/2017 | Ching | ................. | G06F 21/606 |
| 2018/0144640 A1 * | 5/2018 | Price | .................... | G01G 19/086 |
| 2018/0227277 A1 * | 8/2018 | Fischer | .............. | H04L 63/123 |

FOREIGN PATENT DOCUMENTS

| | | |
|---|---|---|
| CN | 101176329 A | 5/2008 |
| CN | 101202624 A | 6/2008 |
| DE | 102010033229 A1 | 2/2012 |
| WO | 0045562 A1 | 8/2000 |
| WO | 0122873 A1 | 4/2001 |
| WO | 03067452 A1 | 8/2003 |
| WO | 2006053459 A1 | 5/2006 |

OTHER PUBLICATIONS

First Chinese Office Action for Chinese Patent Application No. 2013800204.77.X, dated Jun. 16, 2016 (7 pages).

* cited by examiner

FIELD-BUS DATA TRANSMISSION

CROSS-REFERENCE TO RELATED APPLICATIONS

This application is a continuation of International Patent Application No. PCT/EP2013/057077, filed on Apr. 4, 2013, which claims priority to German Patent Application No. DE 10 2012 206 272.6, filed on Apr. 17, 2012, each of which is incorporated by reference herein, in the entirety and for all purposes.

FIELD

The present invention relates to a method for transmitting information in the form of data packages between at least two communication subscribers in a field-bus system and to a communication subscriber for a field-bus system.

BACKGROUND

In industrial automation, technical processes are controlled and monitored by means of computers. In terms of communications, the field devices, such as sensors and actuators, are connected to control computers via a field-bus. In general, the field bus has real-time capability.

An essential demand to field-bus systems is error safety when transmitting information between field devices and control computers. In industrial automation, it must be guaranteed when controlling and monitoring technical processes that no danger occurs for humans and the environment in case of a faulty operation of the field-bus system. For this reason, field-bus systems usually operate according to what is referred to as fail-safe principle according to which the field-bus system is switched to a safe state in case of failure of important components. In order to guarantee that the data exchange between the field devices and the control computers does not take place in a falsified or at least recognizably falsified manner when such safety-relevant control functions are carried out, so-called safety measures are implemented on the field-bus. It is the objective of the safety measures taken in this context to uncover errors with a high probability during transmission of user data in order to minimize the danger undetected errors may cause. The focus of such safety measures are particularly random errors occurring during data transmission.

As a safety measure, the communication subscribers in the field-bus system usually carry out a check-sum routine (e.g. cyclic redundancy check—CRC) in which a check sum is calculated from the user data prior to data transmission which is then transmitted in a data package, e.g. together with the user data. In order to ascertain an error-free data transmission, a corresponding calculation method is applied to the received user data and to the received check sum on the receiving side. The result of the calculation shows whether an unfalsified data transmission has taken place.

Another issue which increasingly occurs apart from the necessity to uncover random errors during data transmission is protecting the integrity of the information transmitted in the field-bus system against attacks. It is the objective of what is referred to as security measures to specifically protect the information against unauthorized modifications. Moreover, the further security measures frequently serve to safeguard confidentiality of the data against unauthorized reading. For this purpose, cryptographic methods are usually applied in order to safeguard the information against attacks. In order to provide a rapid data exchange between the communication subscribers in field-bus systems for carrying out real-time tasks, symmetrical cryptographic methods may be used in which a plurality of communication subscribers uses the same key.

Due to the different objectives of error control and information security, the safety or, respectively, security measures in field-bus systems are usually developed and realized independently from each other. When combining safety and security methods, however, the problem occurs that the routines influence each other and thus cannot completely achieve the protective objectives. For safety measures in field-bus systems, the so-called black-channel principle is usually applied in which the communication subscribers each comprise an error-safety layer which entirely disregards the transmission behaviour on the field bus and, as the case may be, the security measures carried out on the field bus, resulting in that potential impacts on the quality are not adequately considered in the verification routines.

When considering errors within the framework of safety measures, the field-bus is furthermore considered to be a binary symmetrical channel on which signs are falsified independently from one another and with the same probability so that the probability of a faulty transmission of the sign 1 is as high as a faulty transmission of the sign 0. A security layer in which the data are encrypted or, respectively, decrypted, however, changes the communication channel in such a way that the assumption of a binary symmetrical channel does not entirely apply anymore. Since encrypting usually aims for a pseudorandom equal distribution of the encrypted data, the problem may occur that the deterministic criteria required for safety measures, such as the Hamming distance, cannot be observed any longer. The Hamming distance indicates how may signs in a set of data have at least to be falsified so that an unrecognized falsification may occur at all with regard to the safety measures.

In field-bus systems, a consistency of the safety measures in the field-bus system has to be guaranteed all the way from the transmitter to the receiver. If the security measures are during transmission carried out prior to the safety measures in the communication subscribers of the field-bus system, said security measures would have to be safeguarded by further safety measures, such as additional redundancies, in order to guarantee an error control.

It is in principle not possible to additionally fulfil the security demands by means of the safety measures or, vice versa, to realize the safety demands by means of the security measures. The safety measures, in which a check sum is determined for the user data and then transmitted and verified by the receiver, may impede manipulation of the transmitted data. However, it is in general still possible for an attacker to adapt the check sum to manipulated user data so that the security demands cannot be met by the safety measures. Vice versa, an endeavour may be made to fulfil the safety demands by means of the security measures since even random mistakes may be detected with a certain probability. However, these security measures do not meet the safety demands since the deterministic error detection criteria are not fulfilled.

US 2007/0061674 A1 discloses a data transmission in which a security measure is embedded into a safety measure by first carrying out a CRC check and then an encrypting process in the transmitting communication subscriber, whereas in the receiving communication subscriber the decrypting process is carried out prior to the CRC check. US 2003/0223585 A1 and DE 10 2010 033 229 A1 disclose data transmission methods in which an encrypting process as well as an authentication in order to safeguard data integrity are carried out as security measures.

SUMMARY

The present invention provides an improved method for transmitting information in the form of data packages between at least two communication subscribers in a field-bus system and an improved a communication subscriber.

According to an aspect of the invention, in a method for transmitting data in a field-bus system between at least two communication subscribers, each comprising a safety layer with an error-safety layer protecting the data against random data transmission errors and an information-security layer protecting against manipulation of data and/or against unauthorized reading of data, the data of each transmitted data package in the transmitting communication subscriber first passes through the error-safety layer and then through the information-security layer, and in the receiving communication subscriber first passing through the information-security layer and then through the error-safety layer. The information-security layer further has a bipartite configuration, wherein the data processed in the error-safety layer are at first encrypted in the information-security layer of the transmitting communication subscriber, an authentication check value of the encrypted data being calculated which is transmitted together with the encrypted data, and wherein a further authentication check value of the received encrypted data is first calculated in the information-security layer of the receiving communication subscriber, in order to obtain information on the data integrity by evaluating the further authentication check value and the transmitted authentication check value, before decrypting the received encrypted data.

According to a further aspect of the invention, in a method for transmitting data in a field-bus system between at least two communication subscribers, each comprising a safety layer with an error-safety layer protecting the data against random data transmission errors and an information-security layer protecting against manipulation of data and/or against unauthorized reading of data, the data of each transmitted data package in the transmitting communication subscriber first passes through the error-safety layer and then through the information-security layer, and in the receiving communication subscriber first passing through the information-security layer and then through the error-safety layer, wherein two disjoint partitions of a pseudorandom key stream are used in the information-security layer of the transmitting communication subscriber for encrypting and for authenticating, and wherein that two disjoint partitions of the pseudorandom key stream are used in the information-security layer of the receiving communication subscriber for decrypting and for authenticating.

According to a further aspect of the invention, a communication subscriber for a field-bus system for transmitting data, comprises a safety layer with an error-safety layer protecting the data against random data transmission errors and an information-security layer protecting against manipulation of data and/or against unauthorized reading of data. The communication subscriber is configured during transmission mode to process the data to be transmitted first by means of the error-safety layer and then by means of the information-security layer, and during receipt mode to process the data first by means of the information-security layer and then by means of the error-safety layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
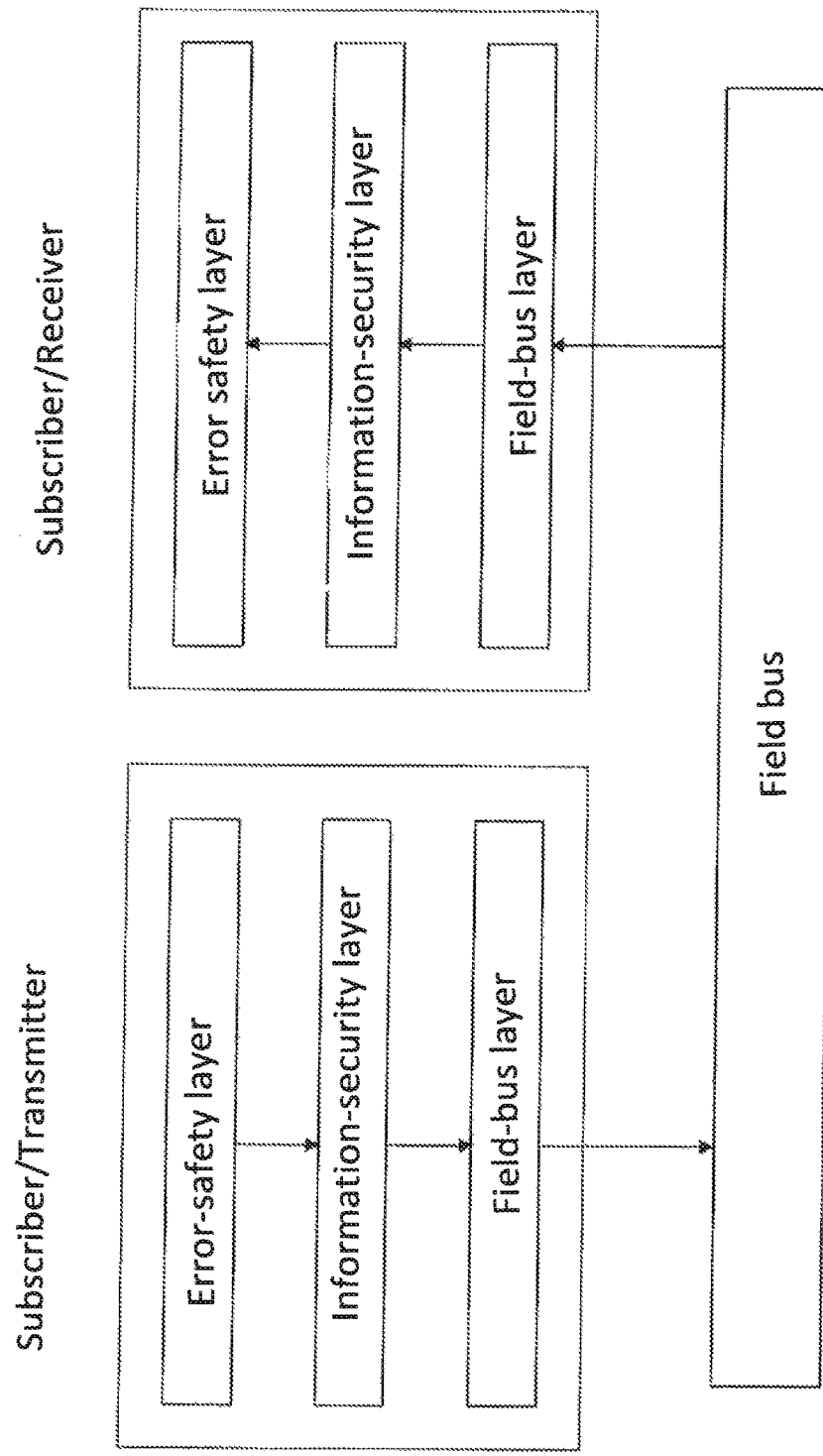
FIG. 1 shows a schematic model of the configuration of a field-bus system according to the invention comprising two communication subscribers.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Current concepts in industrial automation, i.e. controlling and monitoring technical processes by means of software, are based on the idea of controlling by means of a distributed sensor/actuator level. Therein, the communication subscribers communicate with one another and with superordinate systems via local communications networks. The networks used in industrial automation are usually field-bus systems in which field devices, i.e. sensors and actuators, are connected to control computers via a shared transmission path. The transmission network may in this context be configured with differing topologies, e.g. in a ring, star, line or tree topology.

Current field-bus systems use protocols having real-time behaviour, and achieve short cycle times involving low jittering during facility control. The central demand to the field-bus systems is safe and reliable data transmission. When using field-bus systems for controlling and monitoring machines, a safe and reliable data transmission must be guaranteed between the control computers and the field devices, i.e. the sensors and actuators. Thus, it has to be safeguarded that the information represented by user data is transmitted between the communication subscribers in the field-bus system without error, or that such errors are detected. For this purpose, field-bus systems provide safety measures which guarantee that errors, in particular random errors, are detected with high probability, i.e. with a low residual error probability remaining. The safety measures also serve to achieve reliable detection of certain error patterns in order to be, amongst other things, able to keep to a predetermined Hamming distance which determines the number of signs which must at least be falsified so that a falsified set of data can exist which is not recognized as being erroneous.

In addition, field-bus systems have to safeguard that unauthorized reading of transmitted information and/or manipulation of said information is prevented. The security measures thus employed in field-bus systems in this context prevent unauthorized reading of the transmitted information and/or a manipulation of this information by applying cryptographic methods to the data transmitted between the communication subscribers in the field-bus system.

When carrying out safety and security measures in the field-bus system, the problem may occur that due to the differing demands to data integrity, i.e. uncovering data transmission errors in case of the safety measures and determining data manipulation and/or unauthorized reading in case of the security measures, the used measures block each other in their effectiveness. In order to avoid this, a configuration is chosen for the field-bus system in which the physical transmission layer of the field bus is connected to the application via a control layer in the connected communication subscribers. Said control layer is underlaid by a field-bus layer which controls access to the transmission medium and converts the data stream into data packages according to the used protocol. Above the field-bus layer, an information-security layer is configured as a first part of the control layer, carrying out the security measures, and as a second part, an error-safety layer is provided comprising the safety measures.

When transmitting user data in the field-bus system between the communication subscribers, the user data in the transmitter at first pass through the error-safety layer and then through the information-security layer in order to be then converted into data packages in the field-bus layer by corresponding field-bus protocols and to be output onto the field bus. In the receiver, the data then pass through the layers in an inverted order. The received data packages of the field-bus layer are passed on to the information-security layer which, after applying the security measures, passes on the data to the error-safety layer carrying out the safety measures for further processing.

Decoupling safety and security measures by means of separate processing in independent layers, i.e. in the error-safety layer and in the information-security layer provides that the measures may be carried out independently from each other. At the same time, the safety measures or, respectively, the security measures may be exchanged and adapted to new demands in a flexible manner.

The provided order of processing—in the transmitter at first carrying out the safety measures and then the security measures, and in the receiver at first applying the security measures and then the safety measures—provides a consistency of the safety measures and provides that the residual error probability and the deterministic criteria, such as the Hamming distance, may be adhered to.

With regard to the safety measures used in the error-safety layer or, respectively, the security measures used in the information-security layer, in principle no further limitation exists. A check-sum routine is preferably used as a safety measure. In order to determine transmission errors, a check sum is calculated from the user data. An example for such a method is e.g. the CRC. In the CRC, calculation of the check sum is based on polynomial division. The bit sequence of the user data to be transmitted is considered to be a binary polynomial divided by a polynomial generator and leaving a remainder. This remainder is the check sum which is e.g. appended to the user data. In order to verify whether an error-free data transmission has taken place, the received data including the check sum are again interpreted as a binary polynomial and divided by the same generator polynomial as in the transmitter. If the remainder is 0, it is assumed that an error-free transmission has taken place. Further check sum procedures exist, such as horizontal and vertical parity, arithmetic check sum and multiple sending of data.

In the information-security layer, symmetrical cryptographic methods are preferably used. In this context, stream encryption is generally used in which a pseudorandom sequence of signs deduced from the predetermined key is generated. The stream encryption is particularly suitable for real-time transmission.

To protect against manipulation, the information-security layer of the transmitting communication subscriber generates an authentication check value for the data to be transmitted and for a predetermined key and/or an internal state according to a predetermined authentication-calculation method, said value being transmitted, as well, wherein the information-security layer of the receiving communication subscriber calculates a further authentication value for the received data in order to provide information on the data integrity by comparing the further authentication value with the transmitted authentication value. By means of this approach, there is a sufficiently high probability that a data integrity is achieved with regard to the detection of data manipulation. By means of this approach, the receipt of data in the same order as they were sent is safeguarded with a sufficiently high probability. By means of this, amongst other things, deletion and/or re-import of data is detected. At the same time, the security measures may be used together with the safety measures without influencing the quality of the safety measures. The residual error probability and the deterministic criteria, such as the Hamming distance, remain uninfluenced by the measures of the information-security layer.

The information-security layer may have a bipartite configuration including an additional confidentiality layer which preferably carries out an exclusive-or-superimposition (XOR) of the data by means of a pseudorandom key stream. This symmetric approach used for encrypting allows for quick and resource-saving processing, not impacting the real-time capability of the field-bus system. In this context, a partition of the same key stream is preferably used for determining the authentication check value, said partition not overlapping with the partition of the key stream which is used within the framework of the confidentiality-control layer; this simplifies the key exchange between the communication subscribers and allows for quick processing.

Figure 2:
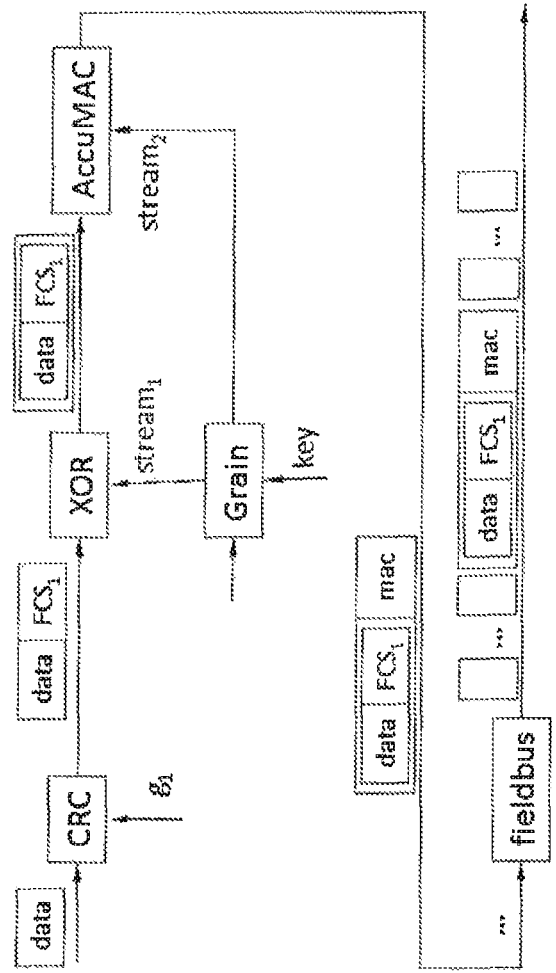
FIG. 2 depicts a data transmission in the field-bus system shown in FIG. 1 in which safety and security measures are carried out by way of examples.

FIG. 2 shows a potential configuration of the data flow in the field-bus system shown in FIG. 1, wherein only the transmitting side is depicted. The user data data are at first processed in the transmitting communication subscriber in its own error-safety layer, wherein a check sum FCS1 is generated e.g. by means of a check-sum routine CRC by means of a polynomial generator g1, the check sum being appended to the user data data. In the information-security layer of the transmitting communication subscriber, an encryption and an authentication-calculation method are then carried out using two disjoint partitions stream1, stream2 of a pseudorandom key stream. Said key stream is e.g. deduced from a key Key or from an internal state by means of an algorithm Grain. The first partition stream1 is then XOR-superimposed by means of the user data data and the appended check sum FCS1. From the XOR-superimposed data stream comprising the user data data and the check sum FCS1, an authentication value mac is then generated by means of the second partition stream2 by using e.g. an authentication-calculation method AccuMAC, the check sum being then appended to the data.

After the data set generated in such a way has been converted from XOR-superimposed user data data and the check sum FCS1 as well as the authentication value mac in the field-bus layer into the transmission protocol used on the field-bus system, the data set is then coupled into the transmission medium of the field-bus system and transmitted. The transmission medium does not have to comprise additional control measures and may thus be an unprotected communications channel.

In the receiving communication subscriber, the transmitted data package is then passed on for further processing to the information-security layer by the associate field-bus layer after converting it according to the transmission protocol used on the field-bus system. In the information-security layer, the same pseudorandom key stream comprising two partitions is then generated by means of the algorithm Grain, wherein one partition is used to evaluate the authentication value mac and the other partition in order to carry out an XOR-superimposition.

After decrypting the data in the information-security layer, the data are subsequently checked in the down-streams-connected error-safety layer of the receiving communication subscriber by using the check-sum method CRC as to whether the transmitted check sum FCS1 is correct.

In order to transmit information in the form of data packages between at least two communication subscribers in a field-bus system, the communication subscribers each comprising a safety layer with an error-safety layer safeguarding the data against data transmission errors and an information-security layer safeguarding the data against manipulation and/or unauthorized reading, the data in the communication subscriber are in transmission mode of the communication subscribers first processed in the error-safety layer and then in the information-security layer, and in the receiving mode the data are first processed in the information-security layer and then in the error-safety layer.

By means of this routine in which the safety and security measures are carried out in two separate layers connected upstream of the field-bus protocol layer in transmission mode of the communication subscriber or, respectively, connected downstream of said protocol layer in receiving mode, the safety demands, i.e. detecting data transmission errors with high probability, as well as security demands, i.e. determining manipulation of data and/or preventing unauthorized reading, may be met in a robust manner. By providing an error-safety layer at the start or at the end of the data transmission path, consistency of the safety measures may be safeguarded. By means of an immediate downstream-connection of the information-security layer in transmission mode or, respectively, by means of an immediate upstream-connection of the information-security layer in receiving mode, the safety demands may be taken into account when realizing the security measures.

The realization of the communication subscribers further has the advantage that the data in the error-safety layer and in the information-security layer are processed quickly and in a resource-saving manner, thus safeguarding the real-time capability of the field-bus system. At the same time, the provided architecture allows for a flexible exchange of the processing routines used within the framework of the safety or, respectively, security measures; thereby, the required safety and security means may be easily and quickly adapted to new demands.

The error-safety layer of the transmitting communication subscriber may determine a check sum for the user data, the error-safety layer in the receiving communication subscriber applying a corresponding calculation to the data, the data integrity may verifiably be safeguarded with regard to the detection of random errors during data transmission. In particular, the safety demands with regard to the residual probability of error occurrence and deterministic criteria such as the Hamming distance may be met in a simple manner by means of this approach.

The information-security layer of the transmitting communication subscriber may generate an authentic check value for the data to be transmitted and for a predetermined key and/or an internal state according to a predetermined authentication-calculation method, the check value being transmitted, as well, the information-security layer of the receiving communication subscriber calculating a further authentication check value for the received data in order to be able to provide an information on the data integrity by comparing the further authentication check value with the transmitted authentication check value. By means of this approach, a data integrity with regard to the detection of data manipulation may be achieved with a sufficiently high probability. By means of this approach, the receipt of data in the same order in which they were sent is furthermore guaranteed with a sufficiently high probability. Thus, deletion and/or re-import of data is, amongst others, detected. At the same time, the security measures may be combined with the safety measures without impacting the quality of the safety measures. The residual error probability and the deterministic criteria, such as the Hamming distance, remain uninfluenced by the measures of the information-security layer.

The information-security layer may comprise a confidentiality-control layer which safeguards the confidentiality of the data. By providing this additional confidentiality-control layer within the framework of the information-security layer, additional protection of the data against unauthorized reading may be achieved. At the same time, the processing within the error-safety layer remains uninfluenced by said additional confidentiality-control layer so that the safety demands remain fulfilled.

The confidentiality-control layer of the transmitting communication subscriber preferably carries out an exclusive-or-superimposition (XOR) of the data by means of a pseudorandom key stream, wherein the confidentiality-control layer of the receiving communication subscriber again carries out an XOR superimposition of the received data by means of the same key stream. This symmetric approach for encrypting allows for quick and resource-saving processing, which does not influence the real-time capability of the field-bus system. Thereby, a partition of the same key stream is preferably used in order to determine the authentication check value, which does not overlap with that partition of the key stream used within the framework of the confidentiality-control layer, thus simplifying the key exchange between the communication subscribers and allowing for quick processing.

The invention claimed is:

1. A method for transmitting data in a field-bus system in which field devices are connected to a control computer via a shared transmission path,
   the field devices and the control computer each representing a communication subscriber, the data being transmitted between at least two such communication subscribers including a transmitting communication subscriber and a receiving communication subscriber, each subscriber comprising a safety layer with an error-safety layer protecting the data against random data transmission errors and an information-security layer protecting against manipulation of data and/or against unauthorized reading of data, the method comprising:

the data of each transmitted data package in the transmitting communication subscriber first passing through the error-safety layer and then through the information-security layer, and in the receiving communication subscriber first passing through the information-security layer and then through the error-safety layer;

wherein the information-security layer has a bipartite configuration comprising two successive steps of processing the data;

wherein, in the information-security layer of the transmitting communication subscriber, the data processed in the error-safety layer are at first encrypted in a first step and then an authentication check value of the encrypted data is calculated in a second step, the authentication check value being transmitted together with the encrypted data from the transmitting communication subscriber to the receiving communication subscriber; and wherein, in the information-security layer of the receiving communication subscriber, a further authentication check value of the received encrypted data is at first calculated in a first step in order to obtain information on data integrity by evaluating the further authentication check value and the transmitted authentication check value, and then the received encrypted data are decrypted in a second step.

2. The method of claim 1, wherein two disjoint partitions of a pseudorandom key stream are used in the information-security layer of the transmitting communication subscriber for encrypting and for authenticating, and wherein the two disjoint partitions of the pseudorandom key stream are used in the information-security layer of the receiving communication subscriber for decrypting and for authenticating.

3. The method of claim 2, wherein the pseudorandom key stream is deduced from a key or from an internal state by means of an algorithm.

4. The method of claim 3, wherein the data processed in the error-safety layer are XOR-superimposed in the information-security layer of the transmitting communication subscriber with the first partition of the pseudorandom key stream and the authentication check value is calculated by means of the second partition of the pseudorandom key stream by using an authentication-calculation method.

5. The method of claim 1, wherein the error-safety layer of the transmitting communication subscriber for the data to be transmitted determines a check sum according to a predetermined check-sum calculation method, the check sum then being transmitted, as well, wherein the error-safety layer of the received communication subscriber applies a corresponding method to the received data and to the check sum in order to identify data transmission errors.

6. The method of claim 1, wherein the two communication subscribers each comprise a field-bus layer, wherein in the field-bus layer of the transmitting communication subscriber the data processed in the information-security layer are converted into a transmission protocol used on the field-bus system, and wherein in the field-bus layer of the receiving communication subscriber the data to be transmitted are converted back from the transmission protocol used on the field-bus system and passed on to the information-security layer for further processing.

7. A method for transmitting data in a field-bus system in which field devices are connected to a control computer via a shared transmission path, the field devices and the control computer each representing a communication subscriber, the data being transmitted between at least two such communication subscribers including a transmitting communication subscriber and a receiving communication subscriber, each subscriber comprising a safety layer with an error-safety layer protecting the data against random data transmission errors and an information-security layer protecting against manipulation of data and/or against unauthorized reading of data, the information-security layer including two successive steps of processing the data, the method comprising:

the data of each transmitted data package in the transmitting communication subscriber first passing through the error-safety layer and then through the information-security layer, and in the receiving communication subscriber first passing through the information-security layer and then through the error-safety layer;

wherein two disjoint partitions of a pseudorandom key stream are used in the information-security layer of the transmitting communication subscriber for a first step of encrypting the data and for a second step of authenticating the data; and wherein the two disjoint partitions of the pseudorandom key stream are used in the information-security layer of the receiving communication subscriber for a first step of decrypting the data and for a second step of authenticating the data.

8. The method of claim 7, wherein the pseudorandom key stream is deduced from a key or from an internal state by means of an algorithm.

9. The method of claim 7, wherein the data processed in the error-safety layer are XOR-superimposed in the information-security layer of the transmitting communication subscriber with the first partition of the pseudorandom key stream and the authentication check value is calculated by means of the second partition of the pseudorandom key stream by using an authentication-calculation method.

10. The method of claim 7, wherein the error-safety layer of the transmitting communication subscriber for the data to be transmitted determines a check sum according to a predetermined check-sum calculation method, the check sum then being transmitted, as well, wherein the error-safety layer of the received communication subscriber applies a corresponding method to the received data and to the check sum in order to identify data transmission errors.

11. The method of claim 7, wherein the two communication subscribers each comprise a field-bus layer, wherein in the field-bus layer of the transmitting communication subscriber the data processed in the information-security layer are converted into a transmission protocol used on the field-bus system, and wherein in the field-bus layer of the receiving communication subscriber the data to be transmitted are converted back from the transmission protocol used on the field-bus system and passed on to the information-security layer for further processing.

12. The method of claim 7, wherein the information-security layer has a bipartite configuration, wherein the data processed in the error-safety layer are at first encrypted in the information-security layer of the transmitting communication subscriber, an authentication check value of the encrypted data being calculated which is transmitted together with the data; and wherein a further authentication check value of the received data is first calculated in the information-security layer of the receiving communication subscriber, in order to obtain information on the data integrity by evaluating the further authentication check value and of the transmitted authentication check value, before decrypting the received data.

13. A communication subscriber for a field-bus system in which field devices are connected to a control computer via a shared transmission path, the field devices and the control computer each representing a communication subscriber for transmitting data, the communication subscriber comprising:

a safety layer with an error-safety layer protecting the data against random data transmission errors; and an information-security layer protecting against manipulation of data and/or against unauthorized reading of data; and the communication subscriber being configured during transmission mode to process the data to be transmitted first by means of the error-safety layer and then by means of the information-security layer, and during receipt mode to process the data first by means of the information-security layer and then by means of the error-safety layer, wherein the information-security layer has a bipartite configuration including two successive steps of processing the data;

wherein, during transmission mode, the information-security layer being configured in a first step to first encrypt the data processed in the error-safety layer and then in a second step to calculate an authentication check value of the encrypted data which is transmitted together with the encrypted data; and during receipt mode, the information-security layer being configured in a first step to first calculate a further authentication check value of the received encrypted data in order to obtain information on the data integrity by evaluating the further authentication check value and the transmitted authentication check value, and then in a second step to decrypt the received encrypted data.

14. The communication subscriber of claim 13, wherein the information-security layer is configured to use two disjoint partitions of a pseudorandom key stream for encrypting and for authenticating during transmission mode, and the information-security layer is configured to use the two disjoint partitions of the pseudorandom key stream for decrypting and authenticating during receipt mode.

15. The communication subscriber of claim 14, wherein the pseudorandom key stream is deduced from a key or an internal state by means of an algorithm.

16. The communication subscriber of claim 14, wherein the information-security layer is configured to XOR-superimpose the data processed in the error-safety layer by means of the first partition of the pseudorandom key stream during transmission mode and to calculate the authentication check value by means of the second partition of the pseudorandom key stream by using an authentication-calculation method.

17. The communication subscriber of claim 13, wherein the error-safety layer is configured to determine a check sum for the data to be transmitted during transmission mode according to a predetermined check-sum calculation method and to apply a corresponding method to the received data and to the check sum during receipt mode.

18. The communication subscriber of claim 13, wherein a field-bus layer is provided which is configured to convert the data processed in the information-security layer into a transmission protocol used on the field-bus system during transmission mode, and to convert back the transmitted data from the transmission protocol used on the field-bus system during receipt mode, and to pass them on to the information-security layer for further processing.

19. The communication subscriber of claim 13, which is connected with a further communication subscriber via a bi-directional field-bus.

* * * * *